No. 774,005. PATENTED NOV. 1, 1904.
B. F. THIES.
TOOL FOR ROUGHENING SIDEWALKS.
APPLICATION FILED FEB. 24, 1904.
NO MODEL.
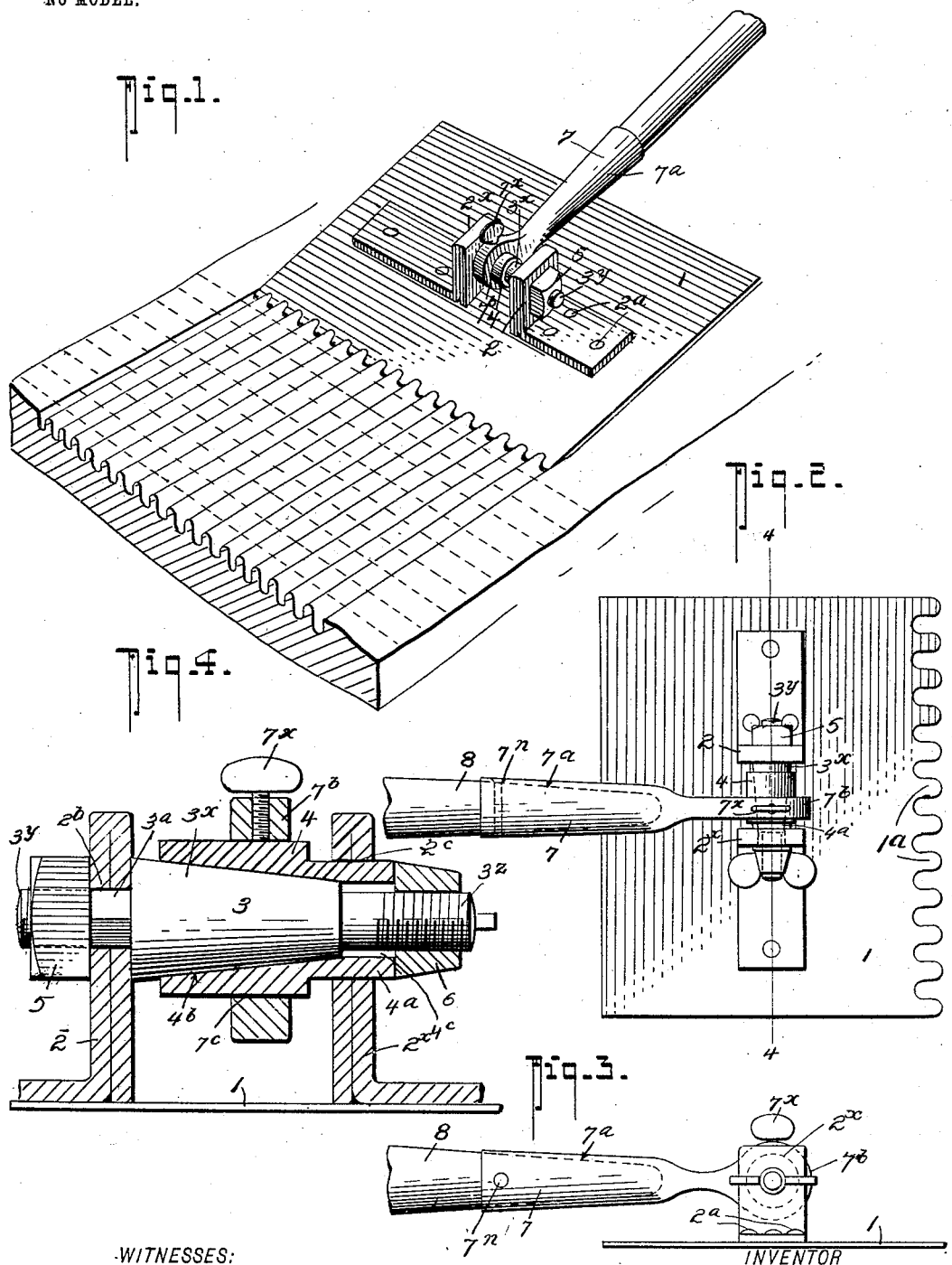
WITNESSES:
F. C. Gibson.
John T. Schrott.
INVENTOR
B. F. Thies.
BY
Fred G. Dieterich & Co.
ATTORNEYS No. 774,005.                                                    Patented November 1, 1904.

UNITED STATES PATENT OFFICE.

BERNHARD F. THIES, OF PORTLAND, OREGON.

TOOL FOR ROUGHENING SIDEWALKS.

SPECIFICATION forming part of Letters Patent No. 774,005, dated November 1, 1904.

Application filed February 24, 1904. Serial No. 195,088. (No model.)

*To all whom it may concern:*

Be it known that I, BERNHARD FRIEDRICH THIES, residing at Portland, in the county of Multnomah and State of Oregon, have invented certain new and useful Improvements in Tools for Roughening Sidewalks, of which the following is a specification.

My invention relates to that class of tools which are particularly adapted for use in finishing the surface of cement sidewalks and the like; and it primarily has for its object to provide an implement of this character of a very simple and economical nature and which will readily and effectively serve its intended purpose.

Generically my invention comprehends a blade having a serrated or toothed edge for imparting a roughened surface to the cement and a handle member adjustably and removably secured to the blade.

Again, my invention comprehends certain novel constructions and combination of parts, all of which will be first described, and specifically pointed out in the appended claims, reference being had to the accompanying drawings, in which—

Figure 1 is a perspective view of my invention as applied for use. Fig. 2 is a plan view thereof. Fig. 3 is a side elevation thereof. Fig. 4 is an enlarged cross-section taken on the line 4 4 of Fig. 2.

Referring now to the accompanying drawings, in which like numerals of reference indicate like parts in all the figures, 1 designates the smoothing plate or blade, which in practice is about ten inches in width and eight and one-half inches long and which has its front edge formed with a plurality of serrations or teeth $1^a$ for the purposes presently to appear. Secured to the blade 1 by rivets $2^a$ or otherwise are a pair of handle members or brackets 2 $2^x$, one of which, 2, has a square aperture $2^b$ to receive the squared portion $3^a$ of the wedge-bolt spindle $3^y$, hereinafter again referred to, while the other bracket, $2^x$, has a circular aperture $2^c$ to receive the end $4^a$ of the sleeve 4, as shown in Fig. 4.

The wedge-bolt 3 consists of a conically-shaped body portion $3^x$ and threaded end spindles $3^y$ $3^z$, adapted to receive the nuts 5 and 6, respectively, the nut 6 being preferably winged, as shown.

The sleeve 4, before referred to, has a conical bore $4^b$ to coöperate with the conical portion $3^x$ of the wedge-bolts 3, and the said conical bore $4^b$ terminates in a straight bore $4^c$ of greater diameter than that of the spindle end $3^z$ of the wedge-bolt 3 to prevent mashing or biting the threads of the said spindle ends.

7 designates a handle-receiving member having a socket $7^a$ to receive the handle 8, which may be of any desired construction to suit the requirements of the operator and which may be secured to the member 7 by rivets $7^n$ or otherwise, if desired. The handle-receiving socket 7 terminates in a flat portion $7^b$, having an aperture $7^c$, and the said portion $7^b$ is adapted to receive the sleeve 4 in its aperture $7^c$ and is adjusted on said sleeve and may be secured from lateral movement thereon by a set-screw $7^x$, preferably having a winged head, as shown in Fig. 1. So far as described it will be seen that by providing a blade with a serrated or tooth edge it is possible by tilting the tool, as shown in Fig. 1, to leave the surface of the cement with a series of parallel grooves and ridges (see Fig. 1) which will readily serve to prevent pedestrians from slipping thereon. By passing the tool at right angles in the position shown in Fig. 1 the surface of the cement may be provided with ridges and grooves at right angles to the first-formed ridges and grooves, as shown in dotted lines in Fig. 1.

By making the handle adjustable the same can be set at any angle to the blade desired, and by constructing the sleeve and wedge as shown the same may be securely tightened and the handle securely held in its adjusted position.

From the foregoing description, taken in connection with the accompanying drawings, it is thought that the complete operation and advantages of my invention will be readily understood by those skilled in the art to which it appertains, and I desire it understood that slight changes in the detailed arrangement and construction of parts may be made without departing from the scope of my invention and the appended claims.

It should be understood that by constructing the tool in the manner shown and described the same can be readily worked while the operator is standing and does not necessitate the operator getting down over the work, as is the case with the tool now in common use. This affords a great saving of time and labor and enables the operator to do considerably more work than is possible in the old way.

Having thus described my invention, what I claim, and desire to secure by Letters Patent, is—

1. In a tool, a blade having a serrated edge, bracket members secured thereto, a wedge-bolt secured to one of said bracket members, a sleeve mounted on said wedge-bolt and in the other bracket member and coöperating with said wedge-bolt, and a handle member mounted on said sleeve for the purposes specified.

2. A tool consisting of a blade having a serrated edge, bracket members secured thereto, said bracket members being apertured, a wedge-bolt having threaded end spindles adapted to pass through said bracket-apertures, said wedge-bolt being secured at one end to one of said bracket members, a sleeve mounted on said wedge-bolt and having portions projected through the apertures in the other bracket, a nut carried by the free end of the bolt for coöperating with said sleeve, and a handle member mounted on said sleeve for the purposes specified.

3. In a tool, a blade, bracket members secured thereto, a wedge-bolt secured to one of said bracket members, a sleeve mounted on said wedge-bolt, and in the other bracket member, and coöperating with said wedge-bolt, and a long handle member mounted on said sleeve, for the purposes specified.

4. A tool consisting of a blade, bracket members secured thereto, said bracket members being apertured, a wedge-bolt having threaded end spindles adapted to pass through the said bracket-apertures, said wedge-bolt being secured at one end to one of said bracket members, a sleeve mounted on said wedge-bolt and having portions projected through the apertures in the other bracket, a nut carried by the free end of the bolt for coöperating with said sleeve, and a handle member mounted on said sleeve for the purposes specified.

B. F. THIES.

Witnesses:
R. W. WILBUR,
PETER LEMKEY.